US008608120B2

(12) United States Patent
Chen et al.

(10) Patent No.: US 8,608,120 B2
(45) Date of Patent: *Dec. 17, 2013

(54) UNIVERSAL MOUNTING APPARATUS

(71) Applicant: Adaptiv Technologies LLC, New York, NY (US)

(72) Inventors: Wayne Chen, New York, NY (US); Adam Gold, New York, NY (US)

(73) Assignee: Adaptiv Technologies LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,606

(22) Filed: Jan. 30, 2013

(65) Prior Publication Data

US 2013/0134275 A1 May 30, 2013

Related U.S. Application Data

(63) Continuation of application No. 12/286,619, filed on Oct. 1, 2008, now Pat. No. 8,366,064.

(51) Int. Cl.
F16M 11/02 (2006.01)

(52) U.S. Cl.
USPC ............... 248/181.1; 248/178.1; 248/288.31; 248/309.1; 403/56; 403/90; 403/122; 403/124; 403/125; 224/413; 224/420

(58) Field of Classification Search
USPC ........ 248/181.1, 181.2, 176.1, 178.1, 231.71, 248/223.41, 125.8, 276.1, 288.51, 288.11, 248/288.31, 205.1, 309.1, 316.5; 403/56, 403/90, 141, 143, 76, 114, 115, 124, 125, 403/126, 142; 224/413, 420, 428, 447, 545, 224/924
See application file for complete search history.

(56) References Cited

U.S. PATENT DOCUMENTS

| 5,845,885 A * | 12/1998 | Carnevali .................... 248/181.1 |
| 6,561,476 B2 * | 5/2003 | Carnevali ................. 248/288.31 |
| 6,729,778 B1 * | 5/2004 | Wu et al. ....................... 396/428 |
| 7,025,315 B2 * | 4/2006 | Carnevali .................... 248/276.1 |
| 7,504,983 B2 * | 3/2009 | Chen et al. ....................... 342/20 |
| 7,647,676 B2 * | 1/2010 | Carnevali ......................... 24/523 |
| 7,830,298 B2 * | 11/2010 | Chen et al. ....................... 342/20 |
| 8,366,064 B2 * | 2/2013 | Chen et al. ................. 248/181.1 |
| 2007/0040080 A1 * | 2/2007 | Carnevali .................... 248/205.1 |
| 2008/0061195 A1 * | 3/2008 | Carnevali .................... 248/125.8 |

(Continued)

Primary Examiner — Todd M. Epps
(74) Attorney, Agent, or Firm — Raymond Sun

(57) ABSTRACT

A ball-and-socket joint assembly includes a stationary object, a movable object, and a mounting apparatus. The mounting apparatus has first and second rigid link sections, each link section having an upper socket section and a lower socket section, so that an upper receiving space is defined by the two upper socket sections and a lower receiving space is defined by the two lower socket sections. The assembly further includes an upper coupler having an upper ball that is received for rotation inside the upper receiving space, with the movable object secured to the upper coupler, and a lower coupler having a lower ball that is received for rotation inside the lower receiving space, with the stationary object secured to the lower coupler. A link member secures the link sections together with the upper ball retained inside the upper receiving space, and with the lower ball retained inside the lower receiving space.

9 Claims, 5 Drawing Sheets

(56) References Cited

U.S. PATENT DOCUMENTS

| | | | |
|---|---|---|---|
| 2008/0203260 A1* | 8/2008 | Carnevali | 248/316.5 |
| 2008/0296454 A1* | 12/2008 | Carnevali | 248/231.71 |
| 2009/0140113 A1* | 6/2009 | Carnevali | 248/223.41 |
| 2010/0201560 A1* | 8/2010 | Chen et al. | 342/20 |
| 2011/0318093 A1* | 12/2011 | Liao | 403/142 |
| 2012/0199620 A1* | 8/2012 | Gold et al. | 224/413 |
| 2012/0248166 A1* | 10/2012 | Gold et al. | 224/545 |

\* cited by examiner

US 8,608,120 B2

UNIVERSAL MOUNTING APPARATUS

RELATED CASES

This is a continuation of Ser. No. 12/286,619, filed Oct. 1, 2008, now U.S. Pat. No. 8,366,064, whose disclosures are incorporated by this reference as though fully set forth herein.

BACKGROUND OF THE INVENTION

1. Field of the Invention

The present invention relates to a flexible mounting apparatus, and in particular, to an improved universal ball-and-socket mounting apparatus.

2. Description of the Prior Art

There are many known mounting apparatus that connect a movable object to a relatively stationary object in a manner where the movable object is supported on the stationary object at variable angular orientations with respect to both of the objects. As non-limiting examples, U.S. Pat. No. 5,845,885 to Carnevali and U.S. Pat. No. 7,025,315 to Carnevali both illustrate universal ball-and-socket mounting apparatus.

SUMMARY OF THE INVENTION

It is an object of the present invention to provide an improved ball-and-socket mounting apparatus that offers advantages over the known devices.

In order to accomplish the above-described and other objects of the present invention, the present invention provides a ball-and-socket joint assembly comprising a stationary object, a movable object, and a mounting apparatus. The mounting apparatus has first and second rigid link sections, each link section having an upper socket section and a lower socket section, so that an upper receiving space is defined by the two upper socket sections and a lower receiving space is defined by the two lower socket sections. The assembly further includes an upper coupler having an upper ball that is received for rotation inside the upper receiving space, with the movable object secured to the upper coupler, and a lower coupler having a lower ball that is received for rotation inside the lower receiving space, with the stationary object secured to the lower coupler. A link member secures the link sections together with the upper ball retained inside the upper receiving space, and with the lower ball retained inside the lower receiving space. Each of the socket sections has a radius, with the radius of the upper socket sections being about 85%-96% of the radius of the lower ball.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
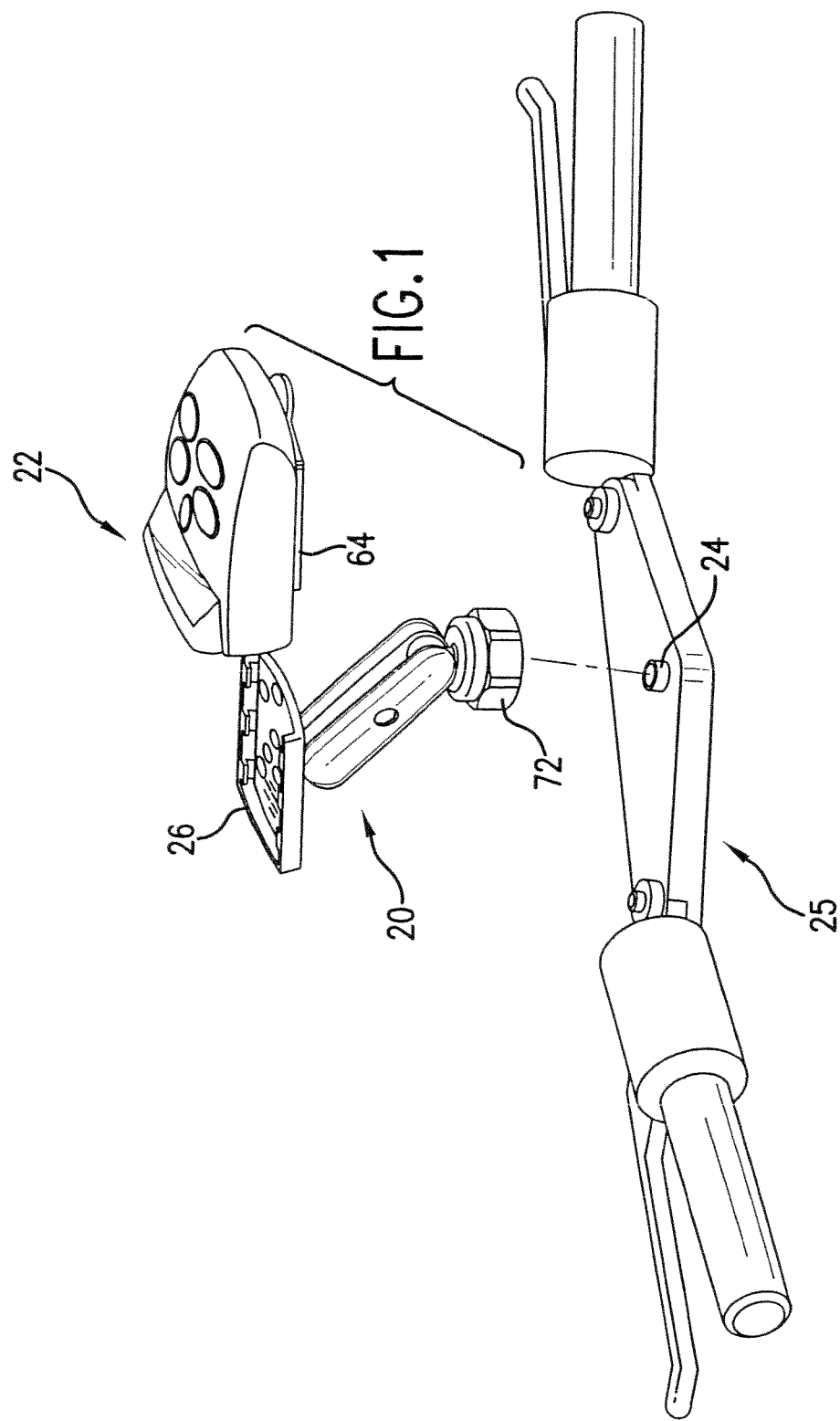
FIG. 1 is a perspective view of a mounting apparatus according to one embodiment of the present invention shown in use holding a radar detector on a handlebar of a motorcycle.
Figure 2:
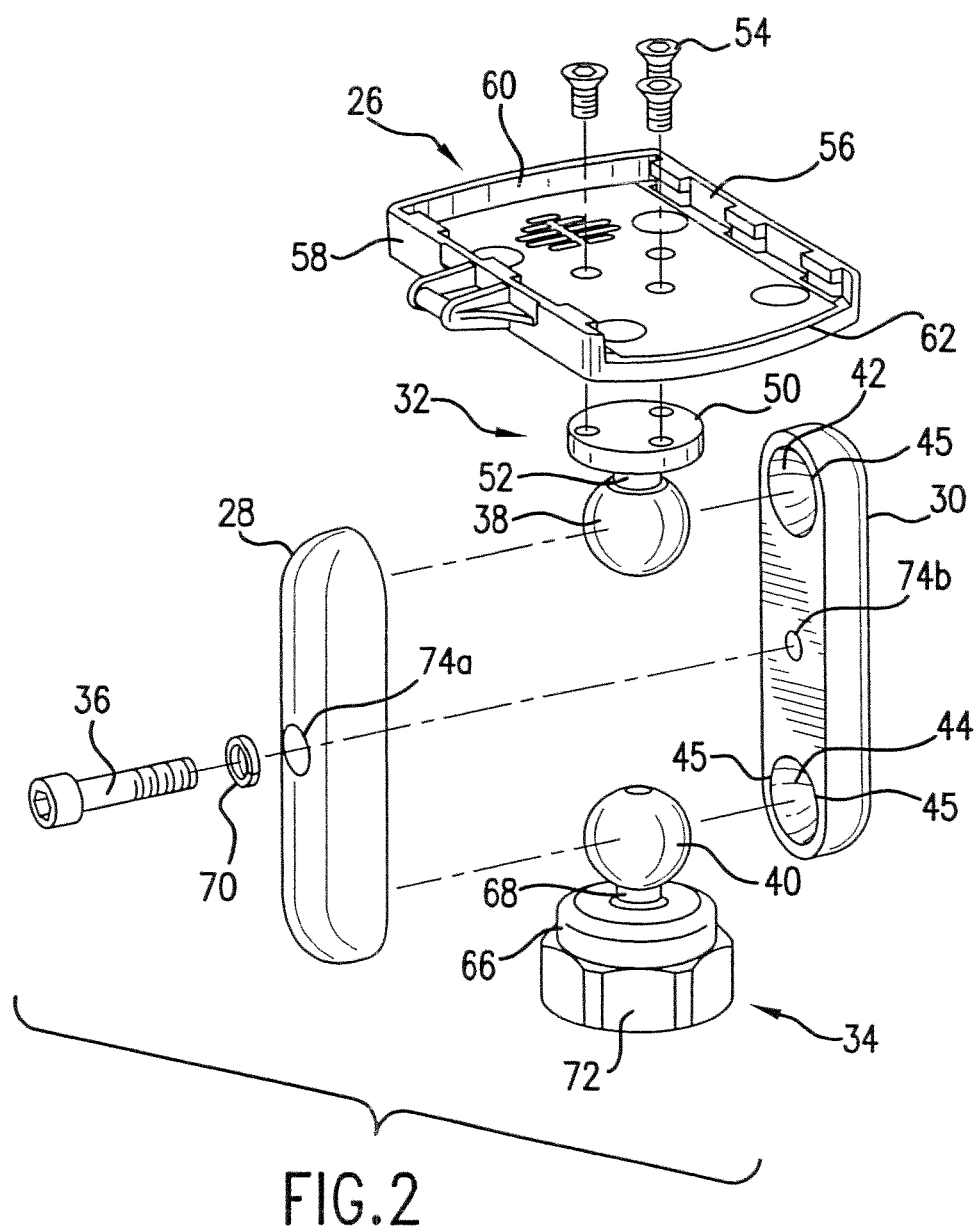
FIG. 2 is an exploded perspective view of the mounting apparatus of FIG. 1.
Figure 4:
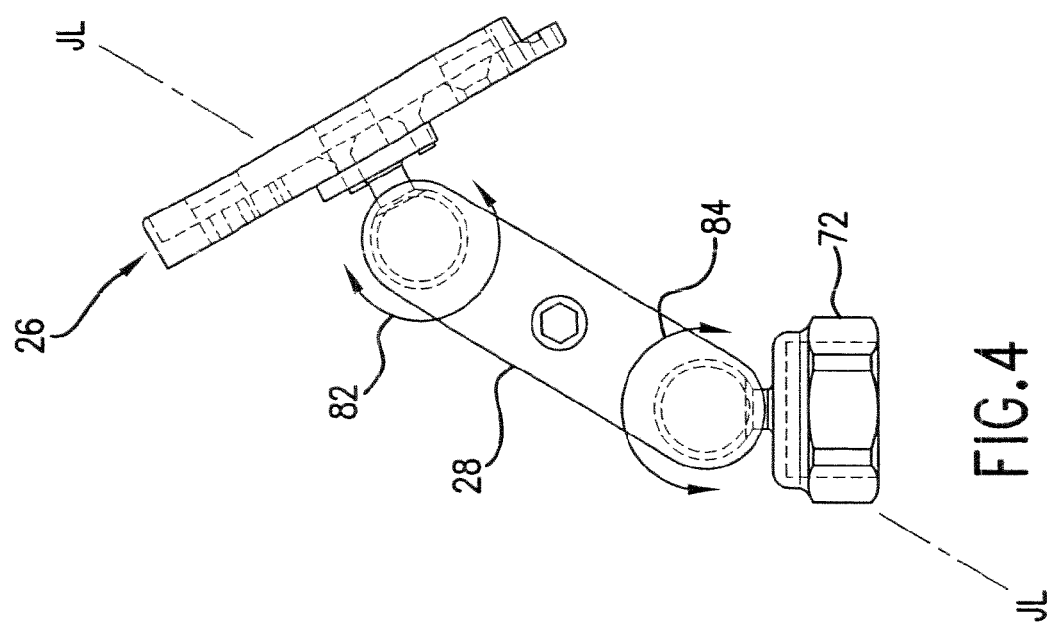
FIG. 4 is a side plan view of the mounting apparatus of FIG. 1.
Figure 3:
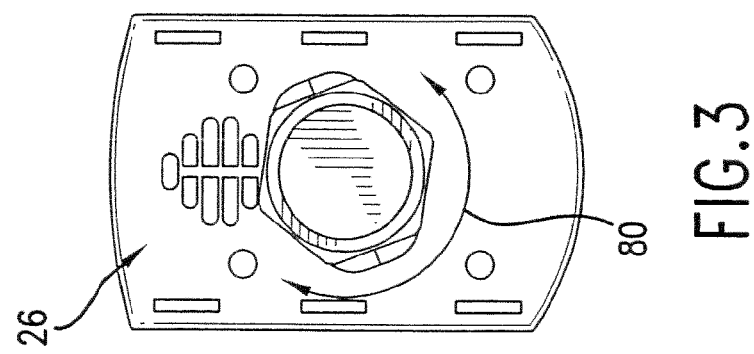
FIG. 3 is a bottom plan view of the mounting apparatus of FIG. 1.
Figure 5:
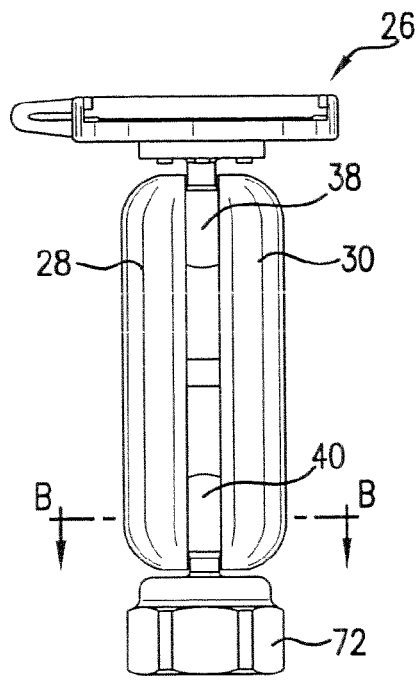
FIG. 5 is a front plan view of the mounting apparatus of FIG. 1.

FIGS. 1-6 illustrate a mounting apparatus 20 according to the present invention. In FIG. 1, the mounting apparatus 20 is shown supporting a conventional radar detector 22 on the yoke stem 24 of a handlebar 25 of a conventional motorcycle. In this embodiment, the yoke stem 24 (and the handlebar 25) is the stationary object and the radar detector 22 is the movable object. The radar detector 22 is removably coupled to a top plate 26 that is rotatably connected to the top end of the mounting apparatus 20. Referring also to FIG. 2, the mounting apparatus 20 comprises a split-arm assembly that has two separate and rigid link sections 28 and 30, an upper coupler 32, a lower coupler 34, and a link screw 36. The link sections 28 and 30 are essentially identical except that their holes 74a, 74b are slightly different. The link section 28 has a countersink and clearance hole 74a, while the other link section 30 has a tapped hole 74b. The upper coupler 32 has a spherical upper ball 38 and the lower coupler 34 has a spherical lower ball 40. Each link section 28, 30 has an upper socket section 42 and a lower socket section 44 positioned adjacent the upper and lower ends, respectively. The link sections 28, 30 are clamped together with the upper ball 38 retained inside the space defined by the upper socket sections 42, and with the lower ball 40 retained inside the space defined by the lower socket sections 44. The link screw 36 functions to clamp the link sections 28, 30 together with the help of a washer 70, by extending through holes 74a and 74b provided at about the center of each link section 28 and 30, respectively.

The upper coupler 32 has a disc-shaped base 50 with a reduced-diameter neck 52 connecting the upper ball 38 and the base 50. The top plate 26 is connected to the base 50 by screws 54. The top plate 26 has two opposing side bars 56, 58 that are connected by a rear bar 60, and the front edge 62 of the top plate 26 is opened, so that the side bars 56, 58 can act as rails for allowing the radar detector 22 to be slid on to the top plate 26 via corresponding rails 64 on the bottom or side of the radar detector 22.

The lower coupler 34 has a disc-shaped base 66 with a reduced-diameter neck 68 connecting the upper ball 40 and the base 66. A yoke nut 72 is secured to the base 66, with the yoke nut 72 adapted to be threadably connected to the yoke stem 24 using known techniques.

The balls 38, 40, the link sections 28, 30 and the bases 50 and 66 are preferably made of the same material, and the material can be a metal, or a plastic. These elements can be made of the same or different materials, but they should all have the same material hardness so that one component does not deform or damage the other.

The link sections 28, 30 are arranged to be operatively juxtaposed to one another along a line of junction JL (see FIG. 4) extending therebetween. Each socket section 42, 44 in each link section 28, 30 has a part spherical surface (see also FIG.

Figure 10:
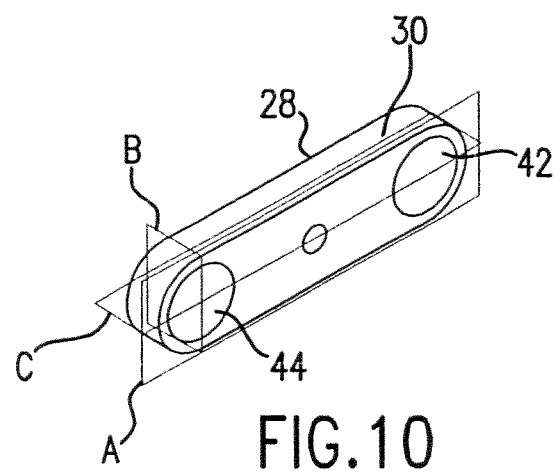
FIG. 10 illustrates the various rotational planes of the combined link sections.

6) in its inner periphery that is adapted to engage a corresponding spherical surface on a ball 38 or 40. Each ball 38 and 40 will experience rotation within its respective socket defined by the socket sections 42 and 44. There are two components to the rotations: the first rotation is a circumferential rotation shown by arrows 82 and 84 in FIG. 4, and the second rotation is a normal circumferential rotation shown by the arrow 80 in FIG. 3. The first rotations 82, 84 are referred to as a circumferential rotation because the link is rotating on the ball 38, 40 around the circumference of the circular line of contact. The plane defined by this circular line of contact can be referred to as the circumferential plane A shown in FIG. 10. The second rotation 80 is referred to as normal circumferential rotation because the link is rotating out of the circumferential plane A. FIG. 10 shows the two circumferential planes B and C for the rotation 80.

Figure 6:
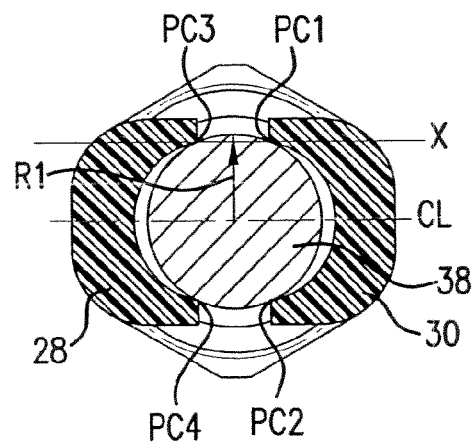
FIG. 6 is a cross-sectional view taken along lines B-B of FIG. 5.
Figure 9:
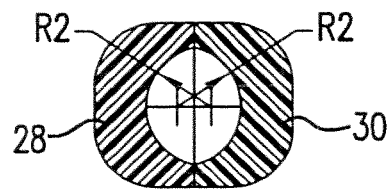
FIG. 9 is the same cross-sectional view of FIG. 6 showing the link sections clamped together without a ball.

In accordance with the present invention, the balls 38, 40 are sized so that their radiuses R1 (see FIG. 6) are slightly larger than the radius R2 of the curvature of the sockets, as best shown in FIG. 9. Such an arrangement provides one circular line of contact 45 at each of the socket sections 42, 44, with the line of contact 45 essentially defined by the edge of the socket section 42, 44, as best shown in FIG. 2. Referring to FIG. 6, one circular line of contact includes the contact points PC1 and PC2 at one socket section, which are defined by the two points that are directly opposite each other in a manner to define the diameter of the circular line of contact 45. Another circular line of contact is defined by similar contact points PC3 and PC4 at the other socket section. The line CL in FIG. 6 is the centerline of the ball 38, 40 and the spherical space defined by the socket. The straight line X that extends through points PC1 and PC3 illustrates the spacing or distance between the centerline CL and the contact points PC1, PC2, PC3, PC4. A corresponding line (not labeled) would go through the contact points PC2 and PC4. The moment (i.e., torque) that will resist circumferential rotation is directly proportional to the distance CL-X between the lines CL and X. Therefore, in FIG. 6, the greater the distance CL-X, the greater the resistance to circumferential rotation.

Figure 7:
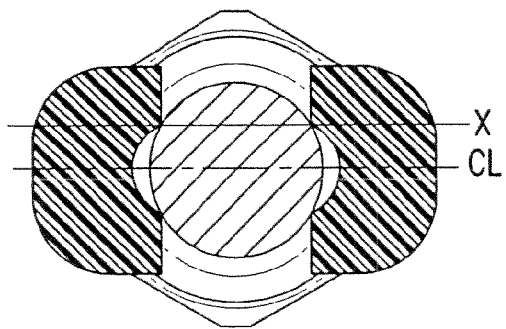
FIGS. 7 and 8 illustrate cross-sectional views of other ball-and-socket arrangements.
Figure 8:
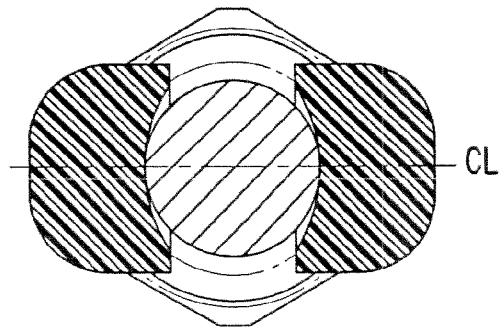

The arrangements shown in FIGS. 7 and 8 compare the preferred arrangement of FIG. 6 to other arrangements, and illustrates this relationship between the resistance to circumferential rotation and the distance CL-X. In the preferred arrangement of FIG. 6, the distance CL-X is almost at its largest, and therefore the moment to resist circumferential rotation is largest. In FIG. 7, if the radius R1 of the balls is too much larger than the radius R2 of the socket sections, the distance CL-X becomes significantly smaller so that the moment to resist circumferential rotation is very small, which has the drawback of allowing rotation too easily. In FIG. 8, if the radius R1 of the balls is smaller than the radius R2 of the socket sections, then the distance CL-X will be zero and the ball-and-socket joint will offer virtually no resistance to circumferential rotation.

In FIG. 6, R2 should be about 85%-96% of R1, and in one preferred embodiment, R1 is 94% of R2. For example, for use in the motorcycle application of FIG. 1, R1 is preferably about 0.32 inches, and R2 is preferably about 0.3 inches.

Even though the mounting apparatus 20 is shown and described in connection with the yoke nut 72 and top plate 26 for use in an automotive (or motorcycle) environment to support a radar detector 22, these are merely non-limiting examples. The mounting apparatus 20 of the present invention can be applied to other applications and used with other connecting mechanisms. Examples include LCD monitors and GPS units, among others.

Figure 11:
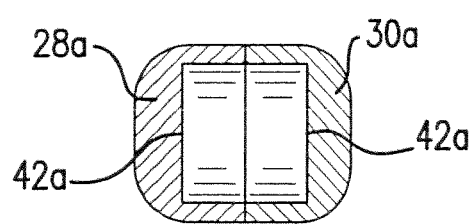
FIG. 11 illustrates a different embodiment of the link sections.

FIG. 11 illustrates a different embodiment of the link sections 28a and 30a, which are the same as the link sections 28 and 30 except that the space defined by the socket sections (e.g., upper socket sections 42a) is cylindrical rather than spherical. In this regard, the space defined by the socket sections can be any shape for a spherical ball as long as there is at least one circular ring of contact per link section 28a, 30a, or at least three points of contact per link section 28a, 30a. For example, a triangular space defined by the socket sections would have three points of contact per link section 28a, 30a.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A ball-and-socket joint assembly for supporting a conventional mobile device on a handlebar of a motorcycle, comprising:
 a stationary object;
 a movable object; and
 a mounting apparatus comprising:
  first and second rigid link sections, each link section having an upper socket section and a lower socket section, so that an upper receiving space is defined by the two upper socket sections and a lower receiving space is defined by the two lower socket sections;
  an upper coupler having a non-deformable upper ball that is received for rotation inside the upper receiving space, the upper ball having a generally convex outer surface, with the movable object secured to the upper coupler;
  a lower coupler having a lower ball that is received for rotation inside the lower receiving space, with the stationary object secured to the lower coupler;
  a link member for securing the link sections together with the upper ball retained inside the upper receiving space, and with the lower ball retained inside the lower receiving space; and
  wherein each of the upper socket sections has a circular outer edge, and wherein each of the circular outer edges has a radius, with the radius of the circular outer edges being less than a radius of the upper ball such that each upper socket section contacts the upper ball only along its circular outer edge.

2. The assembly of claim 1, wherein each circular outer edge defines a circular line of contact, and a centerline extends perpendicular through the center of each circular line of contact for the upper socket sections, and wherein each circular line of contact has first and second contact points at each upper socket section that are directly opposite each other in a manner to define a diameter of the circular line of contact, wherein a parallel line extends between the first contact points of the upper socket sections, with a distance between the centerline and the parallel line being slightly less than a radius of the upper ball.

3. The assembly of claim 1, wherein each of the upper socket sections is cylindrical.

4. The assembly of claim 1, wherein each of the lower socket sections has a circular outer edge, and each lower socket section contacts the lower ball only along its circular outer edge.

5. The assembly of claim 4, wherein each circular outer edge of the lower socket sections defines a circular line of contact, and a centerline extends perpendicular through the center of each circular line of contact for the lower socket sections, and wherein each circular line of contact for the lower socket sections has third and fourth contact points at each lower socket section that are directly opposite each other in a manner to define a diameter of the circular line of contact for the lower socket sections, wherein a parallel line extends between the third contact points of the lower socket sections, with a distance between the centerline and the parallel line for the lower socket sections being slightly less than a radius of the lower ball.

6. The assembly of claim 4, wherein the lower ball is non-deformable.

7. The assembly of claim 1, wherein the radius of the upper socket sections is about 85%-96% of the radius of the upper ball.

8. The assembly of claim 7, wherein the radius of the lower socket sections being about 85%-96% of a radius of the lower ball.

9. The assembly of claim 8, wherein the radius of the upper socket sections is 94% of a radius of the upper ball, and the radius of the lower socket sections is 94% of a radius of the lower ball.

* * * * *